United States Patent
Schukovets et al.

(10) Patent No.: US 10,713,246 B2
(45) Date of Patent: Jul. 14, 2020

(54) COLUMN BASED DATA ACCESS CONTROLS

(71) Applicant: SAP SE, Walldorf (DE)

(72) Inventors: Igor Schukovets, Mannheim (DE); Gregor Tielsch, Ilvesheim (DE); Erich Schulzke, Heidelberg (DE); Nils Hartmann, Heidelberg (DE); Roland Lucius, Darmstadt (DE); Matthias Buehl, Heidelberg (DE); Timm Falter, Sinsheim-Hilsbach (DE)

(73) Assignee: SAP SE, Walldorf (DE)

( * ) Notice: Subject to any disclaimer, the term of this patent is extended or adjusted under 35 U.S.C. 154(b) by 343 days.

(21) Appl. No.: 15/630,404

(22) Filed: Jun. 22, 2017

(65) Prior Publication Data

US 2018/0373757 A1    Dec. 27, 2018

(51) Int. Cl.
| | |
|---|---|
| G06F 17/30 | (2006.01) |
| G06F 21/62 | (2013.01) |
| G06F 16/2453 | (2019.01) |
| G06F 16/22 | (2019.01) |
| G06F 21/31 | (2013.01) |
| G06F 16/2455 | (2019.01) |

(52) U.S. Cl.
CPC ...... *G06F 16/24535* (2019.01); *G06F 16/221* (2019.01); *G06F 21/6227* (2013.01); *G06F 16/24561* (2019.01); *G06F 21/31* (2013.01)

(58) Field of Classification Search
CPC . G06F 16/24535; G06F 21/6227; G06F 21/21
See application file for complete search history.

(56) References Cited

U.S. PATENT DOCUMENTS

| | | | | |
|---|---|---|---|---|
| 6,038,563 | A * | 3/2000 | Bapat | G06F 1/00 |
| 10,055,444 | B2 * | 8/2018 | Arora | G06F 16/2365 |
| 2003/0187848 | A1 * | 10/2003 | Ghukasyan | G06F 21/6227 |
| 2004/0139043 | A1 * | 7/2004 | Lei | G06F 21/6227 |
| 2005/0144176 | A1 * | 6/2005 | Lei | G06F 21/6227 |
| 2005/0246338 | A1 * | 11/2005 | Bird | G06F 21/6227 |
| 2007/0136291 | A1 * | 6/2007 | Bird | G06F 21/6227 |
| 2009/0063490 | A1 * | 3/2009 | Fuerst | G06F 21/6227 |
| 2011/0302180 | A1 * | 12/2011 | Muller | G06F 21/6227 |
| | | | | 707/754 |
| 2013/0212122 | A1 * | 8/2013 | Tootill | G06F 16/20 |
| | | | | 707/769 |
| 2014/0052749 | A1 * | 2/2014 | Rissanen | G06F 21/6227 |
| | | | | 707/759 |
| 2018/0012031 | A1 * | 1/2018 | Block | G06F 21/6218 |
| 2018/0060365 | A1 * | 3/2018 | Mujumdar | G06F 21/6218 |

* cited by examiner

*Primary Examiner* — Shanto Abedin

(74) *Attorney, Agent, or Firm* — Buckley, Maschoff & Talwalkar LLC

(57) ABSTRACT

A system, method, and computer-readable medium, to receive a query specifying a result set of data from at least one database table; determine whether at least one column of the at least one database table is subject to a column-based authorization restriction; modify the query, in an instance it is determined that at least one column of the at least one database table is subject to a column-based authorization restriction, to restrict the result set of data in accordance with the column-based authorization restriction; and execute, in response to the modifying of the query, the modified query.

15 Claims, 6 Drawing Sheets

| | PurchasingOrganization 205 | PurchasingGroup 210 | Non-Restricted Columns 215 | PurchaseOrderNetAmount 220 |
|---|---|---|---|---|
| | Americas | 001 | | $102 |
| | Europe | 001 | | null |
| | Africa | 001 | | null |
| | Asia | 001 | | null |
| | | 002 | | |
| | | 003 | | } 245 |
| | | 006 | | |
| | Pacific | 001 | | null |
| | Middle East | 001 | | null |
| | Japan | 001 | | €607 |

| 205 | 305 |
|---|---|
| Americas | permitted |
| Europe | not permitted |
| Africa | not permitted |
| Asia | not permitted |
| Pacific | not permitted |
| Middle East | not permitted |
| Japan | permitted |

RECEIVE A QUERY SPECIFYING A RESULT SET OF DATA FROM AT LEAST ONE DATABASE TABLE
605

DETERMINE WHETHER AT LEAST ONE COLUMN OF THE AT LEAST ONE DATABASE TABLE IS SUBJECT TO A COLUMN-BASED AUTHORIZATION RESTRICTION
610

MODIFY THE QUERY, IN AN INSTANCE IT IS DETERMINED THAT AT LEAST ONE COLUMN OF THE AT LEAST ONE DATABASE TABLE IS SUBJECT TO A COLUMN-BASED AUTHORIZATION RESTRICTION, TO RESTRICT THE RESULT SET OF DATA PER THE COLUMN-BASED AUTHORIZATION RESTRICTION
615

EXECUTE, IN RESPONSE TO THE MODIFYING OF THE QUERY, THE MODIFIED QUERY
620

SAVE A RECORD OF THE RESULT OF THE EXECUTION IN A MEMORY
625

*FIG. 6*

COLUMN BASED DATA ACCESS CONTROLS

BACKGROUND

Access to a database instance in some database configurations and environments is either granted to or not granted to a user or other data consuming entity on an all or nothing basis. That is, the data consuming user or other entity is either granted full access to the database instance or not. As an example, a data consuming user or other entity might be granted access to a database table for a database instance. As such, the data consuming user or other entity will be able to see and access all of the data of the database table. For example, all of the data on a line or row of a database table will be visible or accessible to the data consuming user or other entity granted access or authorization to the database instance.

However, some users, applications, and other entities may have a desire for a technological tool to efficiently implement a database authorization policy using a column-level access control.

BRIEF DESCRIPTION OF THE DRAWINGS

FIG. 2 is an illustrative example of a database table;

FIG. 3 is an example of a restricting column of the database table of FIG. 2 and restriction values associated therewith;

FIG. 6 is an illustrative flow diagram for some example embodiments herein; and

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
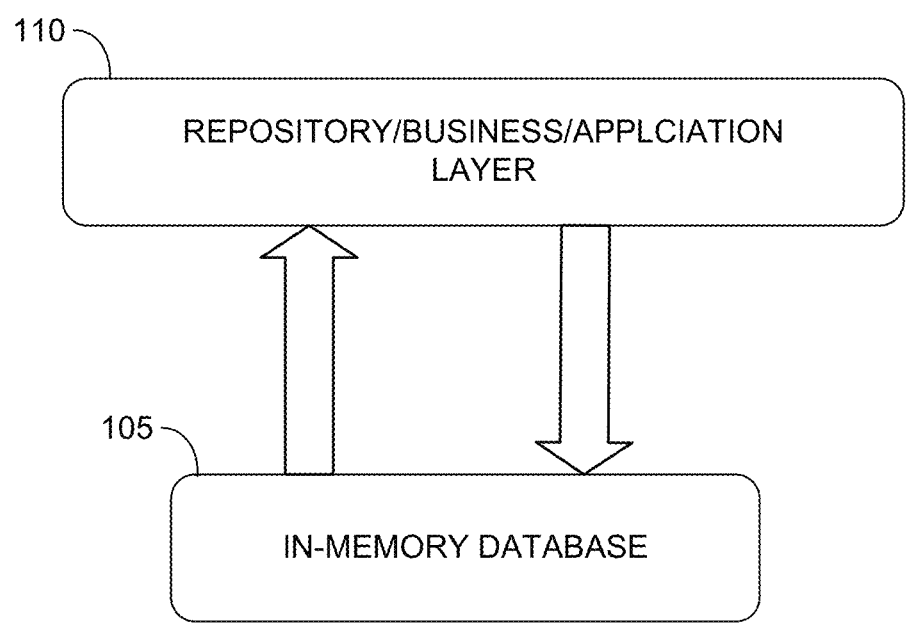
FIG. 1 is an illustrative logical architecture for a database system.

FIG. 1 is an illustrative block diagram of an architecture or system 100, in one example. Examples of some embodiments of the present disclosure are not limited to the particular architecture 100 shown in FIG. 1. System 100 includes an illustrative logical architecture for a database system including an in-memory database layer 105 and a repository, business, and application layer 110. All of the data is stored in database layer 105, where for system 100 all of the data is stored in-memory (e.g., in volatile (non-disk-based) memory such as, for example, Random Access Memory or RAM). The full database may be persisted in and/or backed up to fixed disks (not shown).

Accordingly, there is no need to transfer data between the database layer 105 and the repository, business, and application layer 110. Additionally, as system 100 stores all of the data in RAM, calculations can be performed at the database layer 105 instead of, for example, at the application layer.

In some embodiments, system 100 may include the SAP HANA in-memory database infrastructure (developed by the assignee hereof, SAP SE). In some embodiments, system 100 may include a feature referred to as calculated columns. As used herein, the calculated columns feature (e.g., as implemented in SAP HANA) resides in logic in database layer 105. As referred to herein, the calculated column feature can be invoked to add an additional column to a database table. The results for the calculated column can be calculated at runtime based on existing column(s) (e.g., from a database source table, another calculated column, etc.) and one or more functions, operators (e.g., logic operators, mathematical operators, etc.), input parameters, and constants. In some embodiments, a database instance including features and/or functions similar to the calculated column feature may be leveraged in accordance with other aspects of the present disclosure.

In some aspects, process executions by the database layer 105 (i.e., HANA), including the features thereof (e.g., calculated columns) are capable of being performed faster than traditional database systems that necessarily transfer data between the database layer and other layers (e.g., application layer).

In some embodiments herein, processes and systems might leverage technical aspects and features of an in-memory database infrastructure or framework to effectuate database authorization policies using column-based access controls.

Embodiments herein are not limited to an in-memory implementation of a database. For example, data may be stored in Random Access Memory (e.g., cache memory for storing recently-used data) and other forms of solid state memory and/or one or more fixed disks (e.g., persistent memory for storing their respective portions of the full database).

Some aspects of the column-based access control mechanisms disclosed herein will now be explained and highlighted by an illustrative example use-case. FIG. 2 is an illustrative example of a database table 200 that forms the source data for the following illustrative example. In the present example, a company's security policy states that an end-user can only display (i.e., access) a net amount of a purchase order for particular organizations (e.g., purchase organizations) within the company. Additionally, the security policy dictates that this end-user is only allowed (i.e., permitted) to process purchase orders for the group(s) to which the end-user is assigned. In the present example, the end-user is assigned to purchasing group "001".

Referring to table 200, column 205 ("PurchasingOrganization") includes data values for the purchasing organization, column 210 ("PurchasingGroup") includes data values representing the responsible purchasing group, column 215 represents other non-restricted columns (i.e., not effected by the column-based access restriction(s) of the security policy), and column 220 includes data values for the net amount of the purchase orders. In the current example, column 220 ("PurchaseOrderNetAmount") may be referred to as a "restricted column" since access thereto by the end-user is limited or restricted based on the values in another column, the "PurchasingOrganization" column 205. Column 205 ("PurchasingOrganization") may be referred to as a "restricting column" since the security rights associated therewith form a basis for whether the end-user can access (e.g., view, manipulate, display, save, etc.) restricted column 220.

FIG. 3 includes some details of FIG. 2. FIG. 3 shows, in isolation, the values for the "PurchasingOrganization" column 205. FIG. 3 also shows, in column 305, the security rights, authorizations, privileges, or permissions associated with the values for the "PurchasingOrganization" column 205.

In accordance with some aspects herein, column 305 may correspond to a "calculated column" generated by a database engine of a database instance. Column 305 may be generated, automatically in some embodiments, in response to the execution of a query statement in an effort to enforce the security policy of the database. As illustrated by FIG. 3, column 305 captures (at least in part) the security policy as stated in the introduction of the current example, wherein the company's security policy states that an end-user can only display a net amount of a purchase order for particular organizations within the company (e.g., "Americas" and "Japan" for the end-user of the current example). As shown, each line or row in column 205 is set to either permit (where "permitted" means allow access) or not permit (where "not permitted" means deny access) access to the corresponding value in the associated restricted column ("PurchaseOrderNetAmount") 220.

In this manner, the present disclosure includes a technology implemented column-based access control to restrict access to a database column (i.e., restricted column 220 labeled "PurcahseOrderNetAmount") based on another data item (i.e., restricting column 205 labeled "PurchasingOrganization").

In some embodiments, a restricting factor for a restricted column may be a data item other than a restricting column in a same database table as the restricted column. In some instances, the restricting factor may be a column from a database table different than the database table including the restricted column; a calculated column, whether from the same table as the restricted column or a different table; a data item external to the current database instance (e.g., a current time, a current date, a particular news or other event, etc.); and combinations thereof without limit.

Additionally, FIG. 3, at 310, includes a representation of the purchasing group to which the end-user of the present example belongs. As outlined in the security policy for the present example, the end-user is only allowed (i.e., permitted) to process purchase orders for the group "001" since this is the purchasing group to which the end-user is assigned. As such, the security policy for the present example restricts access to data (at least in part) based on the user's role. Based on the user's inclusion in purchasing group "001", the user has line-level access to all lines or rows in FIG. 2 where "PurchasingGroup" is equal to "001".

However, the security policy in the current example also includes the column-based access control as discussed above. Accordingly, the end-user is permitted access to the rows where "PurchasingGroup" is "001", but access to the restricted column 220 ("PurchaseOrderNetAmount") is limited to displaying the purchase order amounts only corresponding to the restricted column's permitted values (i.e., "Americas" and "Japan").

Execution of a query statement might result in the invocation of the database's security policy. As illustrated in the present example, a result of an implementation of the security policy by the database might result in the end-user being granted access to display/view the purchase order amounts of $102 corresponding to the business' Americas organization and the ability to display/view the purchase order amount of €607 corresponding to the business' Japan organization. This result is achieved in response to the security policy on the database by the column-based access control on the "PurchaseOrderNetAmount" column 220 that restricts access to data items in column 220 based on a value in restricting column 205 (while imposing no restrictions on any other columns (e.g., column 215)) and the line-level restriction based on the "PurchasingGroup" being "001" that allows access to rows where the "PurchasingGroup" value is "001 (while denying access to all other rows (e.g., rows 245 where "PurchasingGroup" is not "001")).

In some embodiments, a database engine might implement, at runtime, the security policy or function (i.e., authorization) of the example above using a calculated column feature of the database. In some instances, source columns for a calculated column that will include the results of a database query subject to the restrictions imposed by the security policy or function can be the restricting columns and the restricted column comprising the column-based access control mechanism in the present example.

The foregoing example includes a security policy which, in the illustrated embodiment, includes both column-based restrictions and line-level restrictions. In some embodiments, a database might execute column-based access controls, line-level access controls, and combinations thereof. That is, the column-based access controls disclosed herein may be used alone or in combination with other database features, functions, and operations, including those now known and those that become known in the future.

Figure 4:
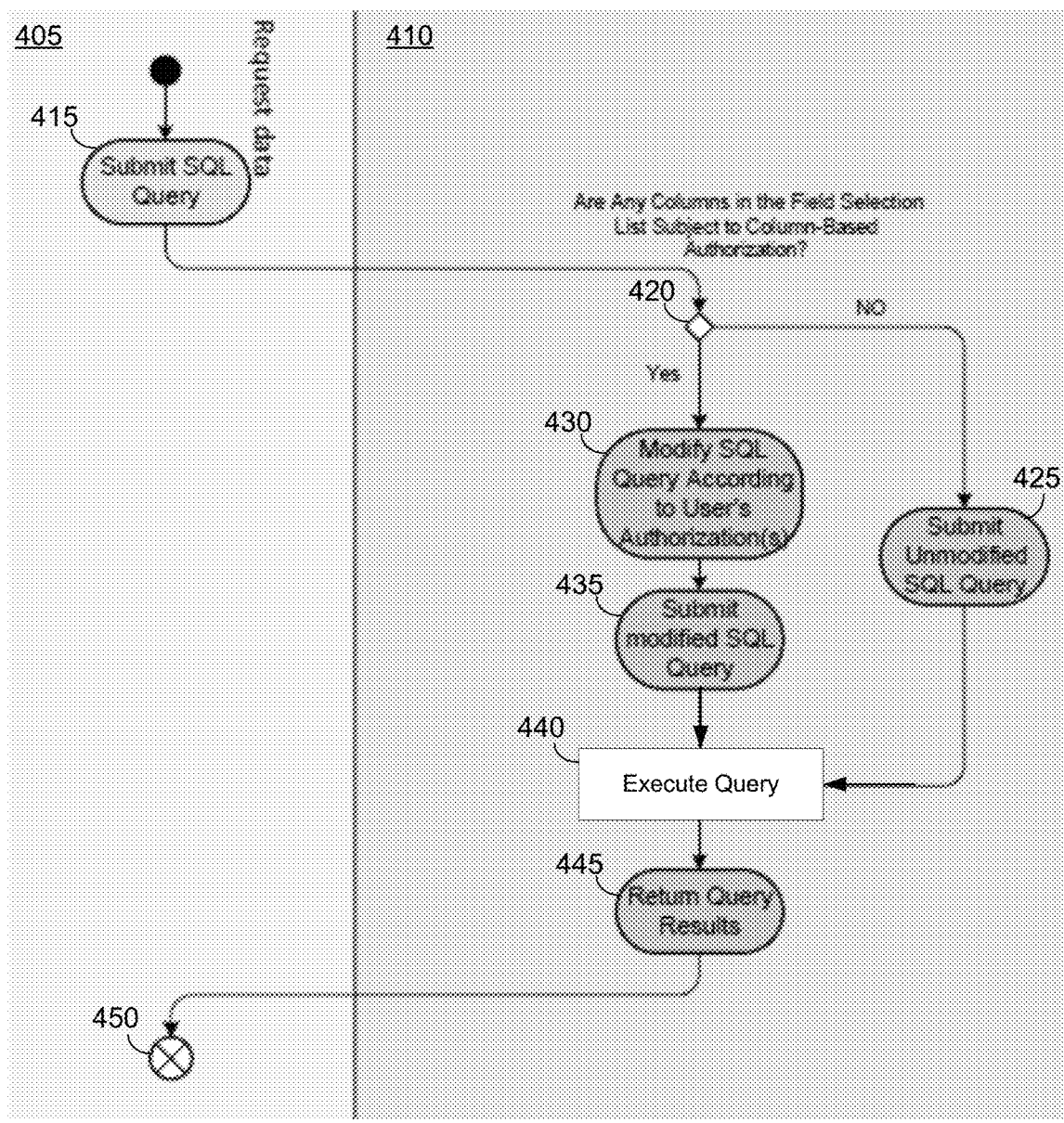
FIG. 4 is an illustrative flow diagram relating to an example column-based access control process herein.

FIG. 4 is an illustrative depiction of an example process flow 400 for some embodiments herein. In particular, process 400 illustrates some aspects and operations of the process, including operations performed by a data consumer 405 requesting data from a database 410. The data consumer submits a data query 415 to the database. The data consumer may be an end-user, a developer, an administrator, an application, service, or device. Data query 415 is submitted, either directly or indirectly, to database 410. In some instances, the query statement is configured as a SQL SELECT statement, although the query may be submitted in other configurations, including any configuration compatible with database 410.

At 420, a determination is made whether any columns in the requested data (e.g., a field selection list) are subject to a column-based restriction or authorization. In the event there are no column-based restrictions as determined at operation 420, then process 400 continues to operation 425. At operation 425, the query is submitted for execution. The submitted query is executed at operation 440.

Returning to operation 420, the determination therein might conclude there is at least one column in the requested data (e.g., a field selection list) that is subject to a column-based restriction or authorization. In this instance, since there is at least one column-based restriction as determined at operation 420, process 400 continues to operation 430. At operation 430, the query statement may be modified to implement the column-based access control for the at least one restricted column. For example, referring to the example of FIGS. 2 and 3, the query may be modified because of a security policy of the database, where the database engine automatically implements a query execution plan that includes column-based access controls.

In some embodiments, the modification of the query statement request for data is automatically invoked and performed at operation 430, without further input or guidance by a user or other entity.

In response to the modification of the query at operation 430, process 400 continues to operation 435 where the modified query is submitted for execution. At operation 440, either the unmodified query from operation 425 is executed or the modified query from operation 430 is executed.

Results of the query execution are obtained at operation 445 and returned to the requesting data consumer at operation 450. In some aspects, operations 420-440 may be automatically performed by database 410 in response to the data request from data consumer 415.

Figure 5:
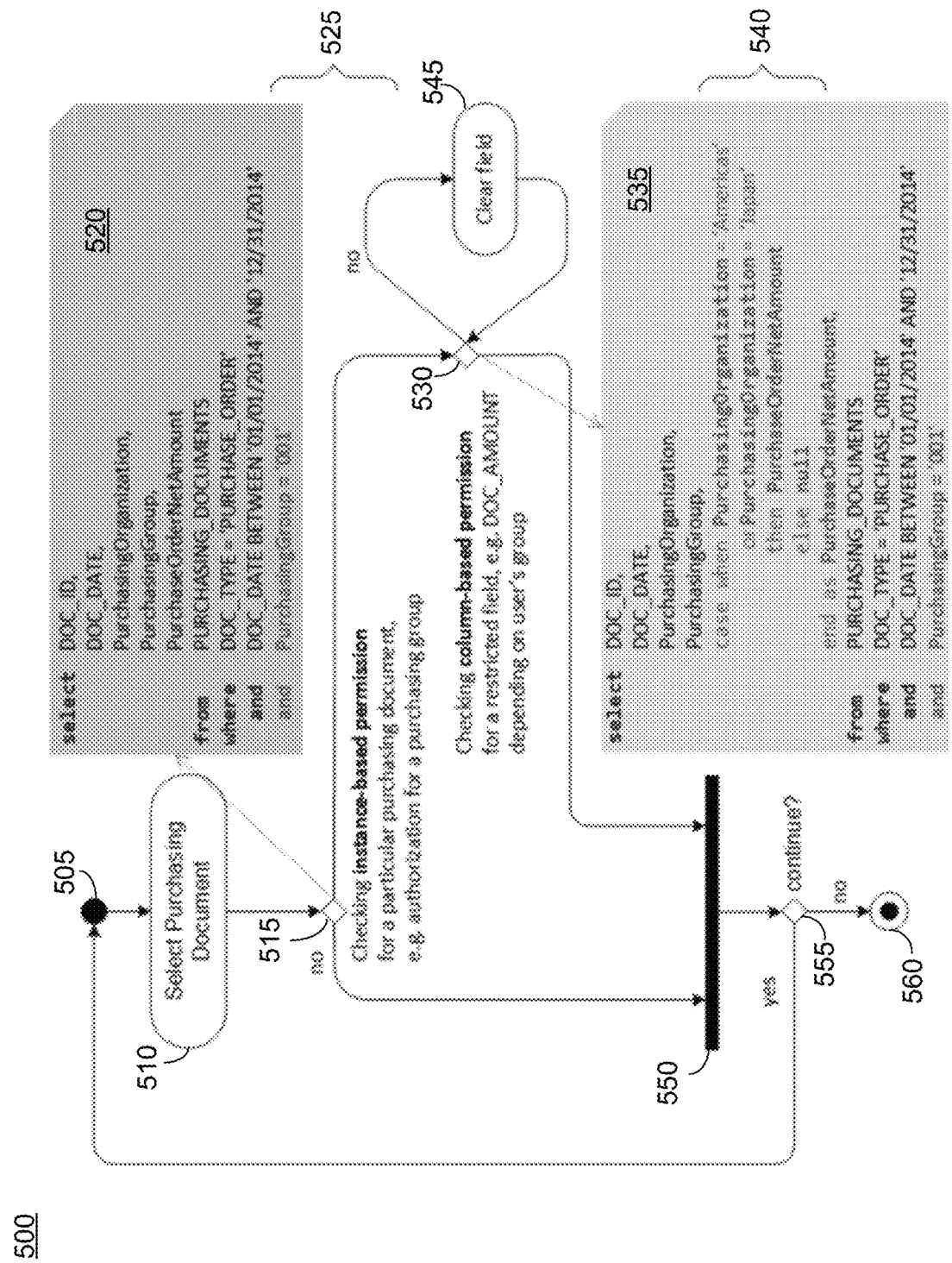
FIG. 5 is an illustrative flow diagram and modified query statements relating to an example of column-based access control process herein.

FIG. 5 is an illustrative depiction of a flow diagram 500 and associated modified query statements 520, 535 relating to an example column-based access control process herein. In some aspects, the flow diagram and query statements depicted in FIG. 5 may relate to the example problem scenario introduced hereinabove with respect to FIG. 2.

At 505, a query or other data request is received that specifies data from a database instance. In the example of FIG. 5, the data request causes the selection of data relating to a particular purchasing document from a database at 510. At operation 515, a determination is made regarding whether the selection of the purchasing document at operation 510 invokes or triggers an instance-based permission authorization. That is, is the purchase document selected at 510 subject to an instance-based permission limitation or restriction. As used herein, an instance-based permission will apply to all rows of the data in a database table for the database instance related to the selected purchase document of the data request.

A SQL SELECT statement 520 is shown in FIG. 5 corresponding to the query or data request received at 505 for selecting a "Purchase Order" document from a database instance including a number of purchasing related documents. Due to a security policy of the database instance, the SELECT statement 520 is modified to include a check to determine the purchasing group of the requesting end-user since the security policy dictates that only users belonging to the "001" purchasing group can be granted access to the selected purchasing document (e.g., "Purchase_Order" type of document). As such, query statement 520 may be amended or changed as indicated at 525 by logic of the database instance to return data only where the "PurchasingGroup" is equal to "001". The result of this modification may be stored in a calculated column (or similar feature) of the database table for the database instance.

In the instance the document selected at operation 510 is not subject to an instance-based permission, given the applicable database instance authorizations or permissions of FIG. 5, process 500 advances to operation 550 from operation 515. Accordingly, the query resulting in the document selected at operation 510 will not be modified as indicated at 525.

At operation 530, due to a further restriction of the security policy of the database instance that impacts the columns of the requested data (i.e., a column-based permission), the SELECT statement is further modified to include a check of a restricted column (e.g., "PurchasingOrganization") to determine the purchasing organization of the requesting end-user since the security policy states that the users belonging to the "001" purchasing group be granted access only to purchase orders for the "Americas" and "Japan" purchasing organizations (i.e., "PurchasingOrganization"="Americas" or "Japan"). As such, the query statement 520 may be further amended or changed as indicated at 540 by logic of the database instance to obtain the SELECT statement 535. As indicated by the loop and operation 545, each value in the restricted column is evaluated. Where the "PurchasingOrganization" is "Americas" or "Japan", then the value in the restricted column is included in the results for the execution of SELECT statement 535. Where the "PurchasingOrganization" is not "Americas" or "Japan", then the value in the restricted column is cleared as shown at 545 and a null value can be included in the results for the execution of SELECT statement 535. The results of this modification may be stored in a calculated column (or similar feature) of the database table.

At 550, the results of the query executions are retuned. The retuned data will be the result of the execution of an unmodified query or the result of the query modified as indicated at by the modified SELECT statements 420 and 535.

Process 500 further considers if additional queries of the database instance are to be performed at operation 555. If more executions are to be performed, then process 500 reverts to 505. If there are no more queries, then process 500 concludes at 560.

In some embodiments, the modification(s) of a query statement or execution plan may be performed "on-the-fly" by a database engine of a database instance. That is, the modifications may be accomplished at runtime of the query execution. In this manner, process 500 may technically implement column-based access controls in an efficient, fast, robust, and secure manner. In some aspects and embodiments, the modifications may be accomplished by the database engine of the database instance, thereby avoiding processing delays that might be experienced by other layers (e.g., requiring data transfers, etc.).

FIG. 6 is an illustrative flow diagram of a process, in accordance with some embodiments herein. While some aspects of FIG. 6 might be captured in some other portions herein, FIG. 6 relates to some embodiments for a column-based access control for a database instance. At operation 605, a query specifying a result set of data from at least one database table is received. The query might be received from one or more entities, including but not limited to an end-user, an administrator, a vendor, an application, a service, a device, or a system.

At operation 610, a determination is made whether at least one column of the at least one database table is subject to a column-based authorization, restriction or permission policy, function, or other column-based limitation. If at least one column of the at least one database table is subject to a column-based authorization, then the query may be modified to restrict the result set of data in accordance with the column-based authorization restriction. The query may be modified to implement the column-based authorization of operation 615. The specific manner in which the query is modified may be similar to the examples disclosed herein. Additional methods and techniques for specifically implementing the query modification are contemplated and within the scope of the present example.

Operation 620 includes an execution of the modified query to return the requested data of the query received at operation 605, subject to the restrictions of the column-based authorization(s) imposed thereon. In some embodiments, the database layer of the database instance includes logic for modifying the query at runtime, as well as executing the query.

The result of the execution of the modified query may be saved in a memory in the form of a record or other data structure (e.g., database table) at operation 625. In some embodiments, the memory may be a persistent memory.

Figure 7:
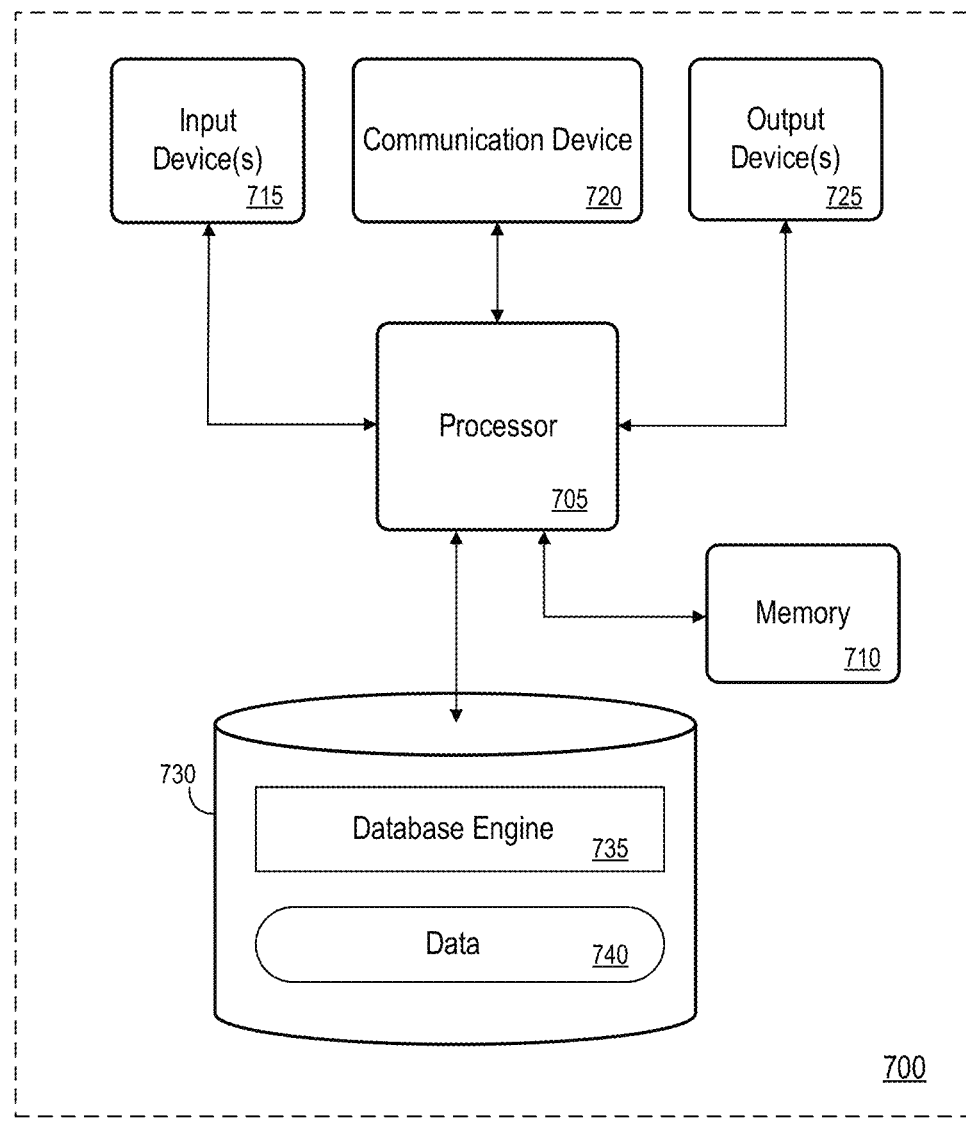
FIG. 7 is an example schematic diagram of a system in an embodiment herein.

FIG. 7 illustrates an exemplary system diagram for performing the processes described herein. Apparatus 700 includes processor 705 operatively coupled to communication device 720, data storage device 730, one or more input devices 715, one or more output devices 725 and memory 710. Communication device 720 may facilitate communication with external devices, such as a reporting client, or a data storage device. Input device(s) 715 may comprise, for example, a keyboard, a keypad, a mouse or other pointing device, a microphone, knob or a switch, an infra-red (IR) port, a docking station, and/or a touch screen. Input device(s) 715 may be used, for example, to enter information into apparatus 700. Output device(s) 725 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 710 may comprise Random Access Memory (RAM), Storage Class Memory (SCM) or any other fast-access memory.

Database engine 735 may comprise logic executed by processor 705 to cause apparatus 700 to perform any one or more of the processes described herein (e.g., 400, 500, and 600). Embodiments are not limited to execution of these processes by a single apparatus.

Data 740 (either cached or a full database) may be stored in volatile memory such as memory 725. Data storage device 730 may also store data and other program code and instructions for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other platforms, frameworks, and architectures may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a memory storing processor-executable instructions; and
    a processor to execute the processor-executable instructions to cause the system to:
        receive a query specifying a result set of data from at least one database table;
        determine whether at least one column of the at least one database table is subject to a column-based authorization restriction, the column-based authorization restriction to restrict access to the at least one column of the at least one database table being based on a column from a database table other than the least one database table including the at least one column;
        modify the query, in an instance it is determined that at least one column of the at least one database table is subject to a column-based authorization restriction, to restrict the result set of data in accordance with the column-based authorization restriction;
        execute, in response to the modifying of the query, the modified query;
        execute, in an instance it is determined that at least one column of the at least one database table is not subject to a column-based authorization restriction, the query; and
        save a record of the result of the execution of one of the modified query and the query in a memory.

2. The system of claim 1, wherein the determination of whether at least one column of the at least one database table is subject to a column-based authorization restriction and the modification of the query is invoked by a database engine of a database instance.

3. The system of claim 1, wherein the column-based authorization restriction to the at least one column of the at least one database table is based on access rights specified in a different restricting column.

4. The system of claim 1, wherein the column-based authorization restriction to the at least one column of the at least one database table is specified by a data item in at least one database table, at least one data item external to a database table, and a combination thereof.

5. The system of claim 1, wherein the result set of data from at least one database table is represented by a database view.

6. A computer-implemented method, the method comprising:
    receiving, by a processor from a data consumer, a query specifying a result set of data from at least one database table;
    determining, by the processor, whether at least one column of the at least one database table is subject to a column-based authorization restriction, the column-based authorization restriction to restrict access to the at least one column of the at least one database table being based on a column from a database table other than the least one database table including the at least one column;
    modifying, by the processor in an instance it is determined that at least one column of the at least one database table is subject to a column-based authorization restriction, query to restrict the result set of data in accordance with the column-based authorization restriction;
    executing, by the processor in response to the modifying of the query, the modified query;
    executing, in an instance it is determined that at least one column of the at least one database table is not subject to a column-based authorization restriction, the query; and saving a record of the result of the execution of the one of the modified query and the query in a memory.

7. The method of claim 6, wherein the determination of whether at least one column of the at least one database table is subject to a column-based authorization restriction and the modification of the query is invoked by a database engine of a database instance.

8. The method of claim 6, wherein the column-based authorization restriction to the at least one column of the at least one database table is based on a value in a different restricting column.

9. The method of claim 6, wherein the column-based authorization restriction to the at least one column of the at least one database table is specified by a data item in at least one database table, at least one data item external to a database table, and a combination thereof.

10. The method of claim 6, wherein the result set of data from at least one database table is represented by a database view.

11. A non-transitory computer-readable medium storing program code, the program code executable by a processor of a computing system to cause the computing system to:
receive a query specifying a result set of data from at least one database table;
determine whether at least one column of the at least one database table is subject to a column-based authorization restriction, the column-based authorization restriction to restrict access to the at least one column of the at least one database table being based on a column from a database table other than the least one database table including the at least one column;
modify the query, in an instance it is determined that at least one column of the at least one database table is subject to a column-based authorization restriction, to restrict the result set of data in accordance with the column-based authorization restriction;
execute, in response to the modifying of the query, the modified query;
execute, in an instance it is determined that at least one column of the at least one database table is not subject to a column-based authorization restriction, the query; and
save a record of the result of the execution of the one of the modified query and the query in a memory.

12. The medium of claim 11, wherein the determination of whether at least one column of the at least one database table is subject to a column-based authorization restriction and the modification of the query is invoked by a database engine of a database instance.

13. The medium of claim 11, wherein the column-based authorization restriction to the at least one column of the at least one database table is based on access rights specified in a different restricting column.

14. The medium of claim 11, wherein the column-based authorization restriction to the at least one column of the at least one database table is specified by a data item in at least one database table, at least one data item external to a database table, and a combination thereof.

15. The medium of claim 11, wherein the result set of data from at least one database table is represented by a database view.

* * * * *